US008506135B1

(12) United States Patent
Oster

(10) Patent No.: US 8,506,135 B1
(45) Date of Patent: Aug. 13, 2013

(54) LED LIGHT ENGINE APPARATUS FOR LUMINAIRE RETROFIT

(75) Inventor: Stephen P. Oster, Auburn, CA (US)

(73) Assignee: Xeralux, Inc., San Jose, CA (US)

( * ) Notice: Subject to any disclaimer, the term of this patent is extended or adjusted under 35 U.S.C. 154(b) by 181 days.

(21) Appl. No.: 13/031,154

(22) Filed: Feb. 18, 2011

Related U.S. Application Data

(60) Provisional application No. 61/338,426, filed on Feb. 19, 2010.

(51) Int. Cl.
*B60Q 1/06* (2006.01)
*F21V 29/00* (2006.01)

(52) U.S. Cl.
USPC ...... 362/373; 362/218; 362/249.02; 362/294; 362/800

(58) Field of Classification Search
USPC ..................... 362/218, 249.02, 294, 373, 800
See application file for complete search history.

(56) References Cited

U.S. PATENT DOCUMENTS

| | | | | |
|---|---|---|---|---|
| 5,195,575 | A | 3/1993 | Wylie | |
| 5,930,115 | A | 7/1999 | Tracy et al. | |
| 6,697,130 | B2 | 2/2004 | Weindorf et al. | |
| 6,739,734 | B1 | 5/2004 | Hulgan | |
| 7,093,952 | B2 | 8/2006 | Ono et al. | |
| 7,329,030 | B1 * | 2/2008 | Wang | 362/373 |
| 7,794,114 | B2 | 9/2010 | Medendorp | |
| 7,812,604 | B2 | 10/2010 | Icoz et al. | |
| 2004/0244950 | A1 | 12/2004 | Zhou et al. | |
| 2006/0221606 | A1 | 10/2006 | Dowling | |
| 2007/0267976 | A1 | 11/2007 | Bohler et al. | |
| 2008/0117597 | A1 | 5/2008 | Zhou et al. | |
| 2008/0186704 | A1 | 8/2008 | Chou et al. | |
| 2009/0322227 | A1 | 12/2009 | Jones et al. | |

* cited by examiner

*Primary Examiner* — Jason Moon Han
(74) *Attorney, Agent, or Firm* — Wilson Sonsini Goodrich & Rosati

(57) ABSTRACT

An LED light engine apparatus is disclosed. The apparatus may provide a simplified, modular method of retrofitting existing luminaires with high-brightness LEDs. The physical structure and method of mounting to the luminaire may enable the light engine to direct the light output such that a wide variety of light output patterns can be achieved in many cases without the need for custom reflectors or optics. The compact size and method and use of heat pipes for heat sinking to the luminaire may enable one or more assemblies to be placed into a luminaire, achieving higher levels of illumination than could be done with LEDs in the prior art.

18 Claims, 7 Drawing Sheets

LED LIGHT ENGINE APPARATUS FOR LUMINAIRE RETROFIT

CROSS-REFERENCE

This application claims the benefit of U.S. Provisional Application No. 61/338,426, filed Feb. 19, 2010, which application is incorporated herein by reference.

BACKGROUND OF THE INVENTION

The need for more energy-efficient products is well established. Reducing demand for electrical power is critical as a growing population demands more power. In California, for example, nearly one third of all electrical power consumed goes toward lighting. Much of that power is used by outdoor commercial and municipal lighting: street lighting, security lighting, and parking lot lighting. There are millions of these lights; they are everywhere. They use various lighting technologies, such as metal halide and sodium.

Many well-known problems exist with the conventional technologies: 1) they are not energy-efficient; 2) they are maintenance-intensive (e.g., many bulbs last less than 3 years in typical use); 3) if a bulb fails, the fixture produces no light output. Until the bulb is replaced, the security of the illuminated area can be compromised.

Current outdoor commercial lighting technology uses a single light source per luminaire. When the bulb is energized light may radiate in all directions. Reflectors can be positioned behind the bulb to capture as much light as possible and reflect it to the front where it exits the luminaire and illuminates the target area. But in a typical luminaire as much as 40% of the light is lost within the unit itself and so is wasted as heat.

LED technology has progressed greatly in the last few years. High-brightness white LEDs are now being used in many lighting applications, including commercial outdoor lighting. There are LED-based streetlight luminaires and parking lot pole-mounted LED luminaires. LED luminaires have a built-in advantage over the conventional lighting sources they replace; light output from LEDs is directional by nature.

But LED luminaires still have to meet roadway lighting type requirements. This means the distribution of light emitted by the luminaire, for example a streetlight or a pole-mounted parking lot light, must be in a pattern that provides the desired lighting level and coverage pattern required by the application. Common roadway lighting types include a round spot, an elongated or oval pattern, or an almost square pattern, on the ground. There are also specialized variations. In bulb-based luminaires, the light distribution is accomplished by means of special reflector designs, and in many cases with light-distributing/diffusing lenses. For LED luminaires, lenses are typically placed over the LEDs to change the light distribution. In some cases reflectors have been placed along the sides of an LED light engine to capture and redirect light to achieve the desired pattern on the ground. This approach has two main problems, which have carried over to LED designs: cost and complexity.

The use of special optics in the form of lenses adds substantial cost, in some cases nearly doubling the material cost of the LED array. Reflector designs are custom-engineered for each model of luminaire and for each type of light distribution. Lighting catalogs are filled with many part numbers to cover the various combinations. This increases the cost of going to market, which is reflected in the high price of the products. Typical LED-based luminaires are very expensive, slowing their adoption and deployment in the marketplace.

One possibility for lowering the cost of changing from conventional to LED lighting technology in outdoor commercial lighting applications is to retrofit existing luminaires, by replacing the contents of the luminaire with the LED light source. The bulb and reflector, socket, ballast, and associated equipment are removed. One or more LED light engines are then typically mounted on custom sheet metal and placed inside the luminaire. While this is method works, it still suffers from the need for optics to achieve all of the typical light distribution patterns required. The capacity for light output for these units is also limited by the ability of the sheet metal mounting structure to sink heat from the LED light engines. The number and type of LEDs required for enough light to replace larger conventional bulbs (250 or 400 Watt), creates a very difficult challenge for a retrofit designer mainly due to the heat sinking requirements. Another problem is these mounting schemes are often very difficult to accomplish because there is so much variation in the interior structure of these luminaires. The metal is customized for each application. Almost every retrofit becomes a custom design.

What is needed is a design for an LED light engine apparatus that can be retrofitted into existing, used or new luminaires and does not require optics or reflectors to modify the light distribution. A further need exists for a light engine that can sink heat so effectively that more than one light engine can be place into a luminaire, enabling light outputs that can replace high-wattage bulb-based systems. What is needed is a compact light engine assembly that can readily be retrofitted into most luminaires.

SUMMARY OF THE INVENTION

An aspect of the invention may be directed to a light system. The light system may comprise a lighting assembly having one or more light source supported by a thermally conductive support plate and one or more heat pipe connected to the thermally conductive support plate and to a thermally conductive base plate. The light system may also comprise a housing at least partially enclosing the one or more lighting assembly and having an exposed housing surface to ambient air, wherein the thermally conductive base plate is in thermal communication with the exposed housing surface.

A method of illumination may be provided in accordance with another aspect of the invention. The method may include providing electrical energy one or more light source supported by a thermally conductive support plate; at least partially enclosing the one or more light source within a housing having an exposed housing surface to ambient air; conducting heat from the light source through the support plate to one or more heat pipe; conducting heat through the heat pipe to a thermally conductive base plate; and conducting heat from the base plate to the housing, thereby allowing heat to dissipate into the ambient air.

Additional aspect of the invention may be directed to a method of retrofitting a luminaire comprising providing a pre-existing luminaire housing; inserting a lighting unit into the luminaire housing, said lighting unit having: one or more light source supported by a thermally conductive support plate; and one or more heat pipe connected to the thermally conductive support plate and to a thermally conductive base plate; and affixing the thermally conductive base plate to an interior surface of the luminaire housing.

Aspects of the invention are directed to commercial outdoor lighting, and in particular, to the use of high-brightness light sources, such as light-emitting diodes (LEDs), in a light engine to replace conventional lighting sources. The light engine may achieve greater energy efficiency, enhanced reliability, and reduced maintenance costs compared to current lighting technology.

A light engine apparatus may mount light source (e.g., LED) modules on a heat-conducting support structure. The heat-conducting support structure may include heat pipes. A top part of the heat-conducting support structure may be mounted to the case of a metal luminaire so heat may be conducted to the luminaire case. The use of heat pipes in the support structure may allow an LED module to be placed at an angle with respect to the luminaire housing so the emitted light may be directed directly downward or at any angle as desired. A heat pipe may be a heat transfer mechanism that can combine the principles of both thermal conductivity and phase transition to efficiently manage the transfer of heat between two solid interfaces.

The entire structure may be rotated in a circle enabling the light direction to be adjusted in any compass direction. Many distribution patterns can be accomplished with this design, eliminating the need for custom optics and reflectors in many applications. The compact, modular design may enable one or more units to be installed in a luminaire limited only by the physical space and the heat sinking capacity of the luminaire.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

The invention provides systems and methods for providing illumination. Various aspects of the invention described herein may be applied to any of the particular applications set forth below or for any other types of luminaires or retrofitted lighting apparatuses. The invention may be applied as a standalone system or method, or as part of an integrated illumination system. It shall be understood that different aspects of the invention can be appreciated individually, collectively, or in combination with each other.

The invention may include one or more lighting units that may be placed within a luminaire housing. A lighting unit may be a lighting assembly or lighting segment that may include one or more light source and heat-dissipation assembly. A lighting unit may have a modular design that may permit a selected number of lighting units to fit into the luminaire housing depending on desired illumination output. The luminaire housing may be a pre-existing luminaire housing that may be retrofitted with one or more lighting unit. Alternatively, the luminaire housing may be a new housing or may be designed for the one or more lighting unit. The number of lighting units that can be placed into a luminaire may be limited only by physical space available inside the luminaire and its heat-sinking capacity.

Lighting Unit

Figure 1A:
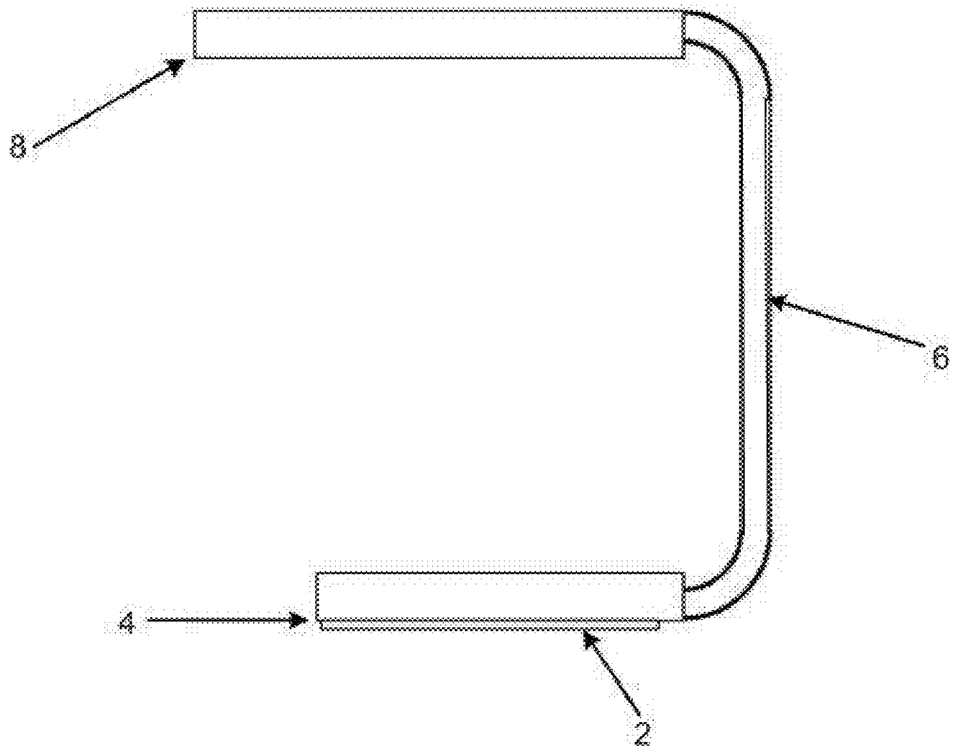
FIG. 1A is a side view of a lighting unit provided in accordance with an embodiment of the invention.

FIG. 1A is a side view of a lighting unit provided in accordance with an embodiment of the invention. A lighting unit may include at least one light source and a heat conducting support structure. A lighting unit may have any orientation with respect to its environment or the direction of gravity. For example, a side of a lighting unit with one or more light source may be directed in the direction of gravity (e.g., toward the earth's core). Alternatively, the side of a lighting unit with one or more light source may be directed opposite the direction of gravity (e.g., toward a sky or ceiling), or perpendicular to the direction of gravity (e.g., toward a horizon). The side of the lighting unit with one or more light source may be angled relative to the direction of gravity (e.g., greater than, less than, or equal to about 5 degrees, 10 degrees, 15 degrees, 20 degrees, 30 degrees, 40 degrees, 45 degrees, 50 degrees, 60 degrees, 70 degrees, 75 degrees, 80 degrees, 90 degrees, 100 degrees, 110 degrees, 120 degrees, 130 degrees, 140 degrees, 150 degrees, 160 degrees, 170 degrees, or 180 degrees relative to the direction of gravity).

In some embodiments, the side of the lighting unit with the light source may be referred to as a top of the lighting unit. The side of the lighting unit opposite the side with the light source may be referred to as a bottom of the lighting unit. Such references may be made with respect to the lighting unit without regard to the orientation of the lighting unit relative to the environment. A lighting unit may emit light in a direction downward relative to the lighting unit.

One or more light sources may be provided on a light source module 2. For example, a light source may be a light emitting diode (LED) which may be provided on an LED module. Any discussion herein of a specific type of light source module, such as an LED module, may also apply to other types of light source modules, and vice versa.

A light source may be an LED. A light source may be an LED package. A light source can be formed of a semiconductor material with a primary optic. A light source may employ solid state lighting. In some embodiments, a light source may be a point source or substantially point source light source. A light source may be a top emitting LED. In other embodiments, a light emitting element may be a side emitting LED or a bottom emitting LED. The light emitting element may direct light in any or multiple directions.

In some embodiments, light sources may be cold cathode fluorescent lamps (CCFLs), or electroluminescent devices (EL devices). EL device may include high field EL devices, conventional inorganic semiconductor diode devices such as LEDs, or laser diodes, as well as OLEDs (with or without a dopant in the active layer). A dopant refers to a dopant atom (generally a metal) as well as metal complexes and metal-organic compounds as an impurity within the active layer of an EL device. Some of the organic-based EL device layers may not contain dopants. The term EL device excludes incandescent lamps, fluorescent lamps, and electric arcs. EL devices can be categorized as high field EL devices or diode devices and can further be categorized as area emitting EL devices and point source EL devices. Area emitting EL devices include high field EL devices and area emitting OLEDs. Point source devices include inorganic LEDs and edge- or side-emitting OLED or LED devices. Alternatively, light source may be employed such as those used in arc lamps, incandescent lamps, fluorescent lamps, halogen lamps.

The light source can produce light in the visible range (e.g., 380 to 700 nm), the ultraviolet range (e.g., UVA: 315 to 400 nm; UVB: 280 to 315 nm), and/or near infrared light (e.g., 700 to 1000 nm). Visible light may correspond to a wavelength range of approximately 380 to 700 nanometers (nm) and is usually described as a color range of violet through red. The visible spectrum from shortest to longest wavelength is generally described as violet (approximately 400 to 450 nm), blue (approximately 450 to 490 nm), green (approximately 490 to 560 nm), yellow (approximately 560 to 590 nm), orange (approximately 590 to 620 nm), and red (approximately 620 to 700 nm). White light is a mixture of colors of the visible spectrum that yields a human perception of substantially white light. The light sources can produce a colored light or a visually substantially white light. Various light sources can emit light of a plurality of wavelengths and their emission peaks can be very broad or narrow. In one example, the emission peaks may be greater than, less than, or equal to about 100 nm, 50 nm, 30 nm, 20 nm, 15 nm, 10 nm, 5 nm, or 1 nm. In some examples, the entire wavelength emission range may be greater than, less than, or equal to about 500 nm, 400 nm, 300 nm, 200 nm, 150 nm, 100 nm, 50 nm, 30 nm, 20 nm, 15 nm, 10 nm, 5 nm, or 1 nm. In a single lighting unit, light sources may comprise a combination of colors.

A lighting unit may include light sources that all emit wavelengths within the same range. Alternatively, light sources that emit light in different wavelengths may be used. For example, a light source module may include one or more color of LEDs. One or more light source may be selected to produce to a desire color output. For example, if a particular wavelength range of illumination is desired, the appropriate LEDs to produce the desired wavelength range may be selected and provided for a light source module.

A light source module may have one, two, three, four or more light sources disposed thereon. For example, a light source module 2 may have greater than, less than, or equal to about 1, 2, 3, 4, 5, 6, 7, 8, 9, 10, 11, 12, 13, 14, 15, 16, 17, 18, 19, 20, 25, 50, 75, or 100 light sources disposed thereon.

One or more light source may be arranged on a light source module 2 in any manner. For example, one, two or more rows or one, two or more columns of light sources may be provided on a light source module. The light sources may form an array with one, two or more rows and one, two or more columns. In some embodiments the rows or columns may have a staggered arrangement. The light sources may be disposed in a concentric pattern, curved patterns, or may have any random arrangement.

The light source module 2 may include a substrate that may support the light sources. In some embodiments, the substrate may be a printed circuit board. The substrate may provide electrical connections between the light sources and a power source. The substrate may provide electrical connections between two or more light sources. The light sources may or may not be electrically connected to one another. Light sources may be electrically connected in parallel, series, or any combination thereof.

A heat conducting support structure may include a first plate 4 and a second plate 8 connected by one or more heat pipes 6. The first plate may be a support plate and the second plate may be a base or mounting plate. A heat dissipating support structure may function as a heat sink. The first plate and/or second plate may be formed of the same material or may be formed from different materials. The first and second plates may be formed from a material with high thermal conductivity. For example, the first plate or second plate can be formed of one or more material with a thermal conductivity of about 10 W/mK or more, 20 W/mK or more, 50 W/mK or more, 100 W/mK or more, 150 W/mK or more, 200 W/mK or more, 250 W/mK or more, 300 W/mK or more, or 400 W/mK or more.

The first or second plate can be formed of a thermally conductive metal such as aluminum, copper, gold, silver, brass, stainless steel, iron, titanium, nickel, or alloys or combinations thereof. The first or second plate can be formed of any other thermally conductive material such as a thermally conductive plastic, silicon carbide, crystalline graphite, diamond, or graphene. In one example, the first and second plates are made of aluminum, such as Aluminum Alloy 6063-T5, due to its low cost and high thermal conductivity. Any material with high mechanical strength and good heat conductivity could be used, including copper metal, or polymer or graphite-based material. In some embodiments, the support plate and bottom plate may be made of aluminum for economy, although copper or any other heat-conducting material with sufficient strength can be used. The same material can be used for the support plate and bottom plate, or different materials can be used.

The first or second plate need not require any surface features, such as fins, in order to cool the lighting unit. Alternatively, the first or second plate may have thermal fins, grooves, knobs, pins, rods, or other features to further improve the cooling of the LEDs.

The first plate 4 or second plate 8 may have various shapes or sizes. In one example, the largest faces of the plates may be flat. For instance, a plate may have a first flat face and an opposing second flat face which may or may not be parallel to the first flat face. In other examples, one or more of the largest faces of the plate need not be flat. For example, one or more faces of the plates may be curved, or include bumps, protrusions, grooves, channels, indentations.

In some embodiments, the first plate and second plate may be rectangular prisms. For example, the largest faces of the plate may have a square or rectangular shape. In other embodiments, the largest faces of the plate may have a triangular, parallelogram, trapezoidal, pentagonal, hexagonal, octagonal, circular, elliptical, or any other shape. The first plate and second plate may have the same shape or may have different shapes.

The first plate and/or second plate may have any size. For example, one or more dimension of the first plate or second plate may be greater than, less than, or equal to about 0.1 inches, 0.25 inches, 0.5 inches, 0.75 inches, 1 inch, 1.5 inch, 2 inches, 2.5 inches, 3 inches, 3.5 inches, 4 inches, 5 inches, 6 inches, 7 inches, 8 inches, 9 inches, 10 inches, or 12 inches.

The first plate and second plate may or may not have the same size. The first and second plates may have lengths, widths, and thicknesses. One or more of the dimensions between the first and second plates may be the same or may be different. In some embodiments, the second plate may have one or more larger dimension than the first plate. Alternatively, the first and second plates may have the same dimensions or the first plate may have one or more greater dimension.

The support plate 4 may support one, two, or more light source module 2. In some embodiments, the substrate of the light source module may directly contact the support plate. In other embodiments, one or more intervening layers may be provided between the substrate and the support plate. The one or more intervening layers may have a high thermal conductivity. For example, the one or more intervening layers may include a thermal interface material that may ensure good thermal contact between the substrate and support plate. The thermal interface material may be flexible or may conform to the shape of the substrate and/or support plate. The thermal interface material may be a thermal grease or other gel-like material.

One, two, or more heat pipes 6 may be provided connecting the first plate 4 and the second plate 8. The heat pipes may provide thermal communication between the first and second plates. The heat pipes may permit heat to be conducted from the first plate, through the heat pipe, to the second plate. The heat pipes may operate as part of a heat transfer agent or medium to provide a thermal conduction path from the light sources through a support plate to a base plate. The heat pipes may be formed of a material with high thermal conductivity. In one example, a casing of a heat pipe containing a working fluid therein may be formed of a material with high thermal conductivity. The material for the heat pipes may include any of the thermally conductive materials discussed elsewhere herein.

One or more heat pipes 6 may be hollow with a working fluid contained therein. The working fluid may be a liquid or gas. For example, the working fluid may be water (e.g., deionized water), methanol, or water/methanol mixture. The heat pipes may have an internal wicking structure. The working fluid within the heat pipes may be heated at a hot interface with the heat pipes (e.g., at or near the first plate), which may or may not be at a low pressure. The working fluid may be a liquid in contact with a thermally conductive solid surface. The working fluid liquid may turns into a vapor by absorbing the heat of that surface. The vapor may condense back into a liquid at a cold interface (e.g., at or near the second plate), releasing the latent heat. The working fluid liquid may then return to the hot interface through either capillary action or gravity action where it evaporates once more and repeats the cycle. In addition, the internal pressure of the heat pipe can be set or adjusted to facilitate the phase change depending on the demands of the working conditions of the thermally managed system. In one example, the heat pipes may be hollow copper or aluminum vessels with an internal wicking structure and working fluid. Alternatively, heat pipes can be made of solid metal such as copper, aluminum or other thermally conductive material.

A heat pipe may have one or more features, characteristics, or components known in the art. See, e.g., U.S. Patent Application No. 2008/0186704; U.S. Pat. No. 5,195,575; U.S. Pat. No. 7,812,604; U.S. Patent Application No. 2008/0117597, which are hereby incorporated by reference in their entirety.

Heat pipes 6 may be thermal communication with the first plate 4 and/or the second plate 8. In some embodiments, strong direct physical contact may be provided between the heat pipes and the plates. In some embodiments, heat pipes may be press-fit into one or more plate. The heat pipes may also be attached to a plate by adhesives (such as epoxy), soldering, brazing, or welding.

The heat pipes 6 may be inserted into holes drilled into the first plate 4 and second plate 8 and may be secured with heat-conducting epoxy material. The holes may extend almost the entire width of the plates 4, 8 to get increased or maximum contact with the plates for improved heat transfer.

The heat pipes may be bent to accommodate the positions and shapes of the plates. For example, as shown in FIG. 1A, the heat pipes 6 may be bent at about 90 degrees in order to permit the first plate 4 and the second plate 8 to be substantially parallel to one another. A heat pipe may be bent at one, two, or more places. The heat pipes may be bent at any degree in order to permit the first and second plates to be at any desirable angle relative to one another. Furthermore, the pipes may optionally be bent with a sufficiently large radius of curvature to permit a working fluid inside to circulate within the heat pipe casing through the bend.

In one embodiment, a flat plate 8 made of heat-conducting material may be connected by heat pipes 6 to another flat plate 4 made of the same material. One or more LED modules 2 may be mounted to a support plate 4. In operation LED modules 2 may generate heat, which may be directly conducted to the support plate 4. The heat may be conducted by heat pipes 6 to the base plate 8.

Figure 1B:
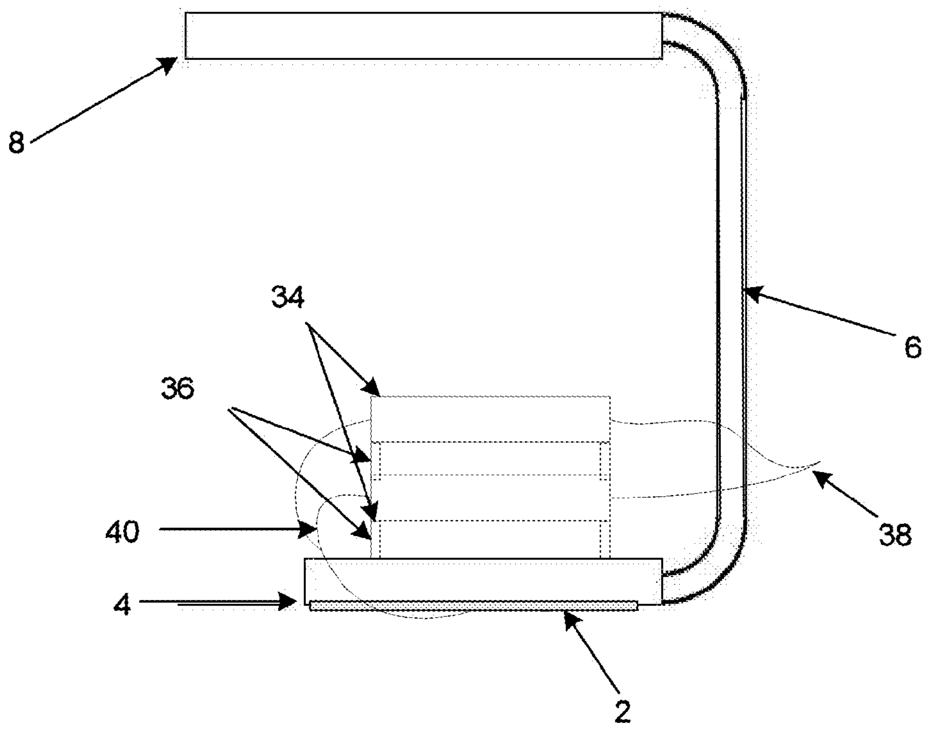
FIG. 1B shows a side view of a lighting unit which includes a driver in accordance with an embodiment of the invention.

FIG. 1B shows a side view of a lighting unit which includes a driver in accordance with an embodiment of the invention. One, two, three, four or more driver modules may be provided in accordance with an embodiment of the invention. In some embodiments one, two or more drive module may be provided per light source module. One, two or more light source module may be provided per drive module.

A drive module may control one or more light sources of a light source module. The drive module may control whether one or more light sources are on or off. The drive module may also control the degree of illumination or brightness provided by a light source (e.g., may act to dim or brighten a light source along a continuous range or between discrete levels). The drive module may maintain or vary any other characteristic of a light source.

Each driver module 34 may be an electronic circuit board that may accept input power through wires 38 and output power to LED modules 2 through wiring harness 40. The wiring harness may be electrically connected to LEDs of the LED modules.

In one example, two driver modules 34, one for each of the LED modules 2, may be mounted on the side of a support plate 4 opposite LED modules 2. Driver modules 34 may be mounted on hardware standoffs 36. The hardware standoffs may provide a gap between a driver module and a support plate surface, or a gap between two or more drive modules.

Driver boards 34 may be mounted one above the other to save space. For example, any number of driver boards (e.g., 1, 2, 3, 4, or more) may be stacked above one another. In other embodiments, the driver boards may be mounted adjacent to one another or with a lateral gap between the driver boards. Driver boards may be mounted both vertically and horizontally relative to one another.

In other embodiments, the driver boards 34 need not be mounted on a support plate 4. In alternate embodiments, driver boards may be mounted on a base plate 8, or may be mounted separately from a heat conducting support structure of a lighting unit. In some embodiments, one or more driver boards may be mounted within a luminaire housing. Alternatively, driver boards may be mounted external to the luminaire housing.

Figure 1C:
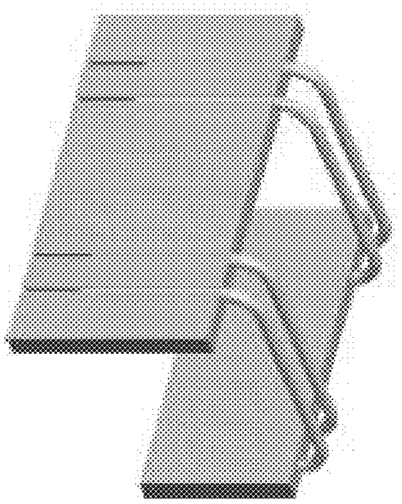
FIG. 1C is a perspective drawing of the lighting unit.

FIG. 1C is a perspective drawing of the lighting unit. As previously described, a lighting unit may have a heat-dissipating assembly which may include a support plate and a base plate which may be connected by one or more heat pipes.

In some embodiments, the support plate or base plate may include one or more holes, slots, grooves, or channels. A heat pipe may be fitted into a hole, slot, groove, or channel. In some embodiments, the heat pipe may be press fitted into the plate. In some embodiments, an adhesive, such as epoxy, may be employed to retain the heat pipe within the plate.

The heat pipe may extend part of the way through a support plate or a base plate, as shown in FIG. 1C. Alternatively, the heat pipe may extend all of the way through a support plate or base plate. The heat pipe may or may not protrude through two ends of the support plate or base plate. In some embodiments, a heat pipe may only protrude from one side of a plate.

The heat pipe may extend through a portion of a support plate underlying one or more light sources. In some embodiments, the heat pipe may extend through a portion of the support plate underlying a first row, second row, or third row of light sources. In some embodiments, the heat pipe may extend through portions of the support plate underlying all of the light sources. The heat pipe may extend through the support plate until it extends as far as or further than the light source that is furthest from where the heat pipe enters the support plate.

The heat pipe may extend through a portion of a support plate or base plate. In some embodiments, a heat pipe may extend more than, less than, or equal to about one tenth, one eighth, one sixth, one fifth, one quarter, one third, one half, two thirds, three quarters, four fifths, five sixths, seven eighths or nine tenths of the way through the support plate or base plate.

A portion of the heat pipe extending through a portion of the support plate or base plate may have a working fluid therein. Alternatively, the portion of the heat pipe extending through the portion of the support plate or base plate may be solid.

In some embodiments, all heat pipes of a lighting unit may connect the support plate and the base plate on the same side. This may advantageously permit the heat pipes to be bent to a desired angle without requiring the lengths of the heat pipes to be altered. Alternatively, they may be provided on different sides.

Figure 2:
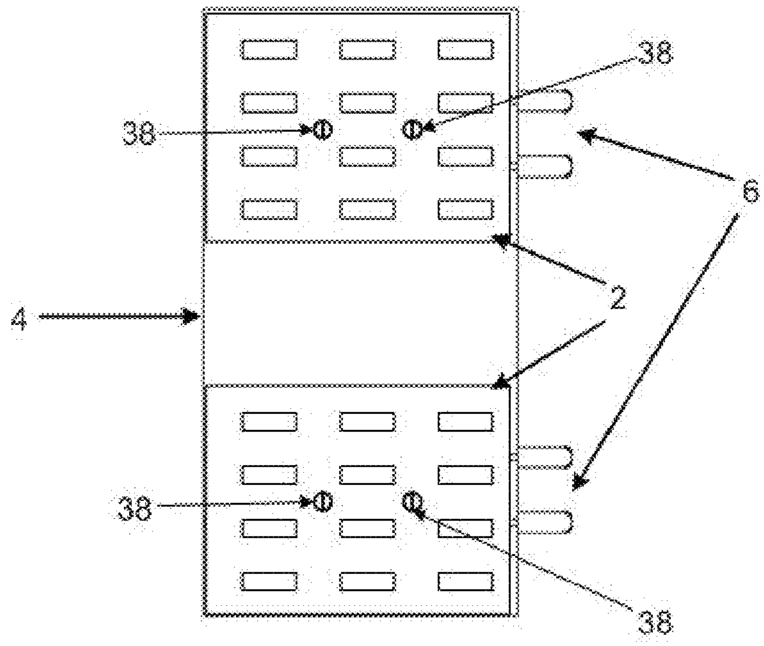
FIG. 2 is a bottom view of the lighting unit in accordance with an embodiment of the invention.

FIG. 2 is a bottom view of the lighting unit in accordance with an embodiment of the invention. Light source modules, which may be LED modules 2 may be mounted on a support plate 4 using sheet metal screws 38, which may thread into tapped holes in the support plate 4. One, two or more heat pipes 6 may be fitted into holes drilled in plate 4 under each LED module 2.

One, two, three, four or more light source modules may be mounted on a support plate. If a plurality of light source modules are provided, the light modules may be mounted adjacent to one another. A gap may or may not be provided between light source modules. In some embodiments, a single light source module may be provided per support plate.

A light source module may be mounted on the support plate in various manners. For example, they can be mechanically fastened using one or more screw, rivet, clamp, or any other fastener. Alternatively, an adhesive may be employed. A strong connection may be provided between the light source module and the support plate in order to provide good thermal communication between the light source and the support plate.

In some embodiments, each light source module may have the same number of light sources thereon. In another embodiment, different numbers of light sources may be provided for different light source modules. The light sources may be positioned as arrays on the light source module. For example, a light source module may have 1, 2, 3, 4, 5, 6, 7, 8, 9, 10 or more rows of light sources and/or 1, 2, 3, 4, 5, 6, 7, 8, 9, 10 or more columns of light sources.

In some embodiments, one or more heat pipe 6 may connect a support plate and base plate. In some embodiments, one, two or more heat pipes may be provided per light source module supported by a support plate. In one example, two heat pipes 6 may be provided for each of two light source modules 2 supported by a support plate 4. A heat pipe may extend through a portion of the support plate underlying the corresponding light source module. One, two or more heat pipes may be spaced so that they divide the light source module into equal or substantially equal portions. For example, if two heat pipes are provided per light source module, they may be positioned so that they are each about ⅓ of the way from an edge of the light source module.

Figure 3:
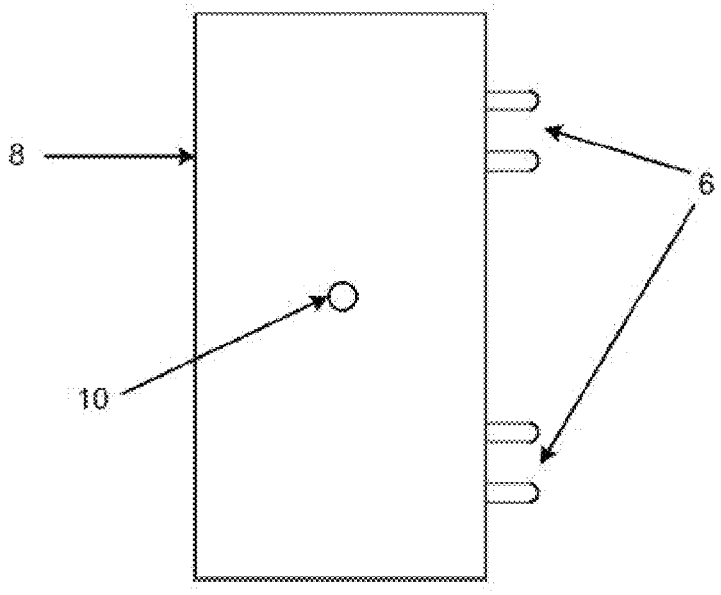
FIG. 3 is a top view of the lighting unit in accordance with an embodiment of the invention.
Figure 4A:
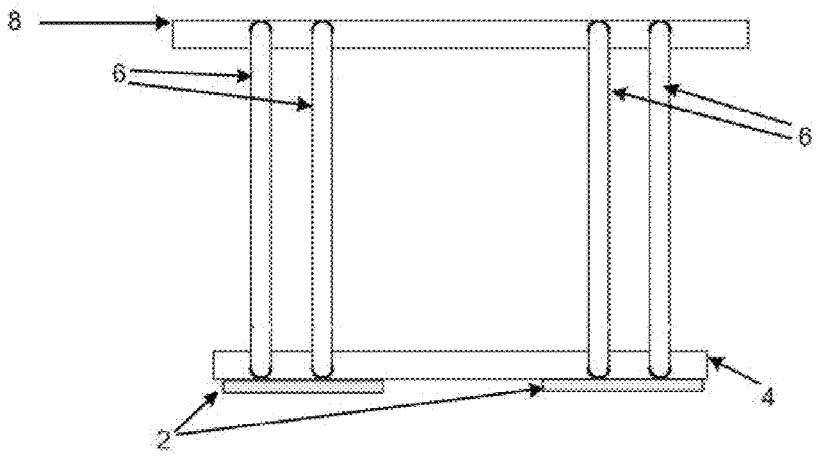
FIG. 4A is a rear view of the lighting unit in accordance with an embodiment of the invention.

FIG. 3 is a top view of the lighting unit in accordance with an embodiment of the invention. A threaded hole 10 may be located in a base plate 8 for mounting the base plate 8 to the inside of a luminaire (lighting fixture). Heat pipes 6 may be are fitted into holes drilled into plate 8. A screw may be screwed through the threaded hole to mount the base plate to an internal surface of the luminaire. The base plate may be mounted to an internal surface of a luminaire in any other manner, including other forms of fasteners, adhesives, or locking into position, FIG. 4A is a rear view of the lighting unit in accordance with an embodiment of the invention. Heat pipes 6 may connect a base plate 8 and one or more support plate 4 with light source modules 2 thereon. The light source modules may be mounted on the bottom of the lighting unit.

The heat pipes 6 may or may not be spaced evenly along the lighting unit. In some embodiments, the heat pipes may be grouped by the corresponding light source module 2 with which they are in thermal communication. For example, a larger gap may exist between heat pipes in thermal communication with different light source modules than heat pipes in thermal communication with the same light source module.

Figure 4B:
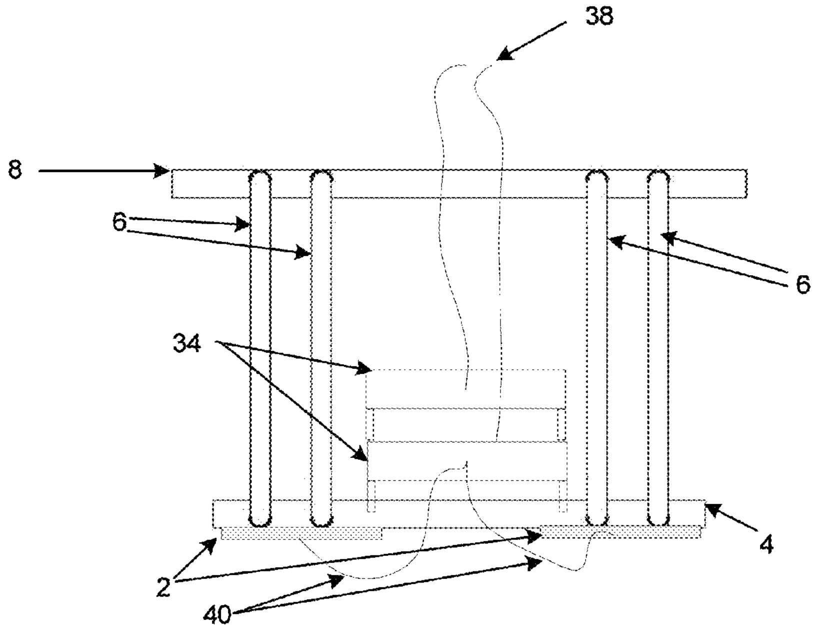
FIG. 4B is a rear view of a lighting unit having a driver.

FIG. 4B is a rear view of a lighting unit having a driver module 34. The driver module may be mounted on a support plate 4. The driver module may be mounted on the face of the support plate facing a base plate 6. The driver module may be mounted on the face of the support plate that is opposing the face of the support plate with LED modules 2 mounted thereon. FIG. 4B shows another view with driver modules 34 in place mounted on standoffs 36. The driver modules may input power through wires 38 and output power to LED modules 2 through wiring harness 40.

In some embodiments, the base plate 8 and support plate 4 may be slightly thicker that the diameter of heat pipes 6. The base plate and support plate may be thick enough to permit a hole to be drilled through the plates, into which the heat pipes can be press-fitted. In some embodiments, the plate thickness may be greater than, less than, or equal to about 1 mm, 3 mm, 5 mm, 6 mm, 7 mm, 8 mm, 9 mm, 10 mm, 11 mm, 12 mm, 13 mm, 14 mm, 15 mm, 17 mm, 20 mm. Heat pipes 6 may be greater than, less than, or equal to about 0.5 mm, 1 mm, 2 mm, 3 mm, 4 mm, 5 mm, 6 mm, 7 mm, 8 mm, 9 mm, 10 mm, 12 mm, 15 mm in diameter, made of copper, and contain a sintered wick structure plus a small amount of liquid. The liquid in this case is deionized water, but can be methanol, water/methanol mixture, or other choices as needed to optimize for various operating temperature ranges.

The heat pipes may be fully inserted and epoxied into holes drilled in the plates 8 and 4 that may extend at least ¾ of the widths of base plates 8 and/or the support plate 4. The epoxy may be thermally-conductive epoxy. On the support plate 4 the heat pipes 6 may be located directly under the LED modules 2 to achieve most effective heat transfer to plate 8. The diameter and length of the heat pipes, plus the number of heat pipes used, may be calculated from the amount of heat generated by LED modules 2 that needs to be removed.

In one embodiment, each LED module 2 may generate about 30 Watts of heat. Two heat pipes 6, each of 6 mm diameter, may provide more than enough heat-conducting capacity to keep LED module 2 temperature below design limits. A base plate 8 in the embodiment shown may be about 4"×7', and a support plate 4 may be about 3"×7". The exact size of the support plate 4 may vary and may be chosen to provide sufficient mounting are for LED modules 2. In some embodiments, the length and width size of the base plate 8 may be calculated and/or selected. In some instances, the base plate may require enough surface area to make contact with the case of the luminaire into which the lighting assembly is mounted such that heat can be effectively conducted. In some embodiment, such as the lighting assembly illustrated in FIG. 1, the area of plate 8 may be about 28 square inches, which with 60 Watts of heat generated (e.g., from two LED modules) may provide about 2.1 Watts per square inch of conduction area. In some embodiments, the area of the base plate may be selected such that less than about 3 Watts per square inch, 2.5 Watts per square inch, 2.3 Watts per square inch, 2.0 Watts per square inch, 1.8 Watts per square inch, 1.5 Watts per square inch is provided.

A base plate 8, which makes contact with the luminaire and convects the heat, is shown as a flat plate in FIGS. 1A-4B, which works well with flat surfaces. Some luminaires are curved, and some have irregular metal surfaces. In such cases, the base plate 8 can be cast or machined to conform to the shape of the luminaire, or a spacer made of the same material as the base plate 8 and shaped to conform to the contour of the mounting surface. It is essential to make good physical contact between plate 8 and the mounting surface of the luminaire to achieve proper heat conduction.

Luminaire Configurations

One or more lighting unit assembly may be provided within a luminaire. A luminaire may have a housing that may at least partially enclose one or more lighting assembly. In some embodiments, the luminaire housing may fully enclose one or more lighting assembly. The enclosure may or may not be airtight. Alternatively, the luminaire housing may partially enclose one or more lighting assembly. The luminaire housing may at least partially or fully enclose one or more light source module of the lighting assembly. For example, a portion of a lighting assembly may protrude from or extend beyond a luminaire housing. The luminaire housing may have an internal surface and an external surface. The internal surface may or may not be enclosed. The internal surface may or may not be exposed to open air. For example, if the luminaire housing fully encloses the contents therein, the internal surface is not exposed to open air. The exterior surface of the housing may be exposed to open air.

In some embodiments, a luminaire may be provided for outdoor lighting. Alternatively, the luminaire may be provided for indoor lighting. The luminaire may refer to lighting fixtures which may be mounted on a surface, such as a pole, wall, roof, ceiling, ground, or may be hanging or supported in any other manner. The luminaire may refer to a free standing or portable light such as a table lamp or standing lamp. The luminaire may refer to a fixed light such as a recessed light (e.g., cans, pot lights, troffer light, cover light, torch lamp, torchiere, or floor lamp), surface mounted light (e.g., chandelier, pendant light, sconce, track lighting, under-cabinet lighting, emergency lighting or exit lighting, high- and low-bay lighting, or strip lights or industrial lighting), or outdoor lighting (e.g., pole- or stanchion-mounted lighting, pathway lighting, bollard, sign light, street light, yard light, garden light, or solar lamp). The luminaire may refer to special-purpose lights (e.g., accent light, background light, black-light, flood light, safelight, safety lamp, searchlight, step light, strobe light, theatrical light, or wallwasher).

Figure 5A:
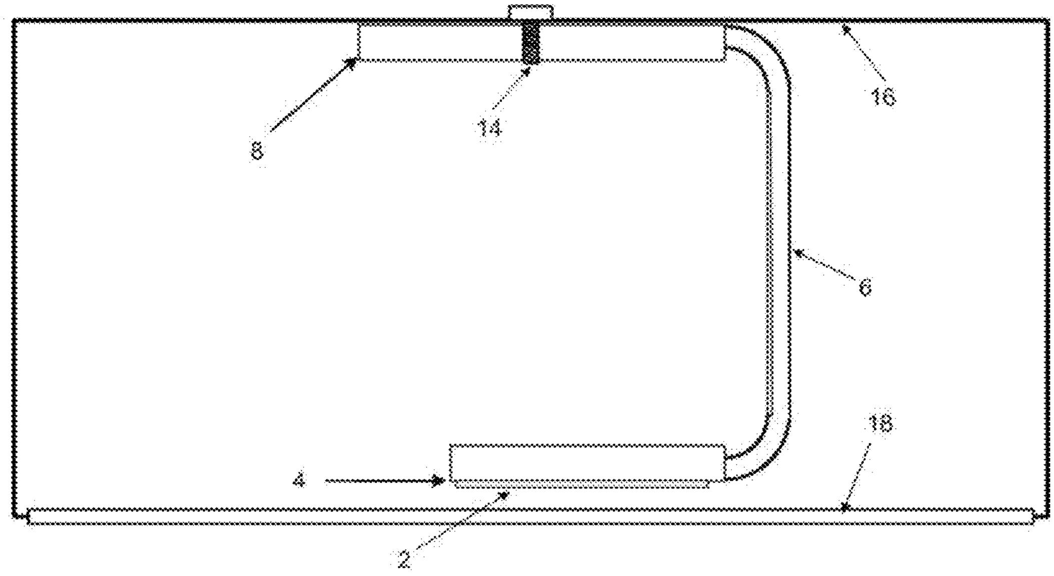
FIG. 5A illustrates a lighting unit inside a luminaire in accordance with an embodiment of the invention.

FIG. 5A illustrates a lighting assembly inside a luminaire in accordance with an embodiment of the invention. A light assembly may include a heat-dissipating assembly and one or more LED modules. The light assembly may have one or more characteristics or features of the embodiments described elsewhere herein. The luminaire may include a housing 16 which may include a window 18. The window may be optically transparent or translucent. The window surface may be flat or may include one or more surface features. The window may be a lens, diffractor, diffuser, reflector, or have any other optical property. Alternatively, the window need not be a lens, diffractor, diffuser, or reflector. The window may permit transmission of light therethrough. In some embodiments, one, two or more windows may be provided on the housing and may be located at any location on the luminaire. The rest of the housing may or may not be transparent. In some embodiments, the rest of the housing may be opaque. The rest of the housing may be formed of a thermally conductive material, such as other thermally conductive materials described elsewhere herein.

A mounting plate 8 may be securely fastened to the top of a luminaire 16 by a bolt 14, which passes through a hole drilled into luminaire 16 and goes into the mounting plate 8. Any other fastener or fastening technique may be employed to fasten the lighting assembly to the luminaire. A strong connection may be provided between the mounting plate and the luminaire to permit good thermal connectivity between the mounting plate and the luminaire housing. Heat may be conducted from the mounting plate to the luminaire housing and to the ambient air surrounding the luminaire housing.

Heat may be conducted from a heat source of the lighting assembly to the mounting plate, and conducted from the mounting plate to an exterior surface of the luminaire housing. Heat may be removed from the luminaire via radiation or convection.

Heat may be generated from one or more LED. Heat may be conducted from the LED module 2 to an underlying support plate 4. Heat from the support plate 4, may be conducted to the mounting plate 8 by heat pipes 6, and then may be conducted from the mounting plate 8 to the luminaire 16, and from the luminaire case to outside air. The heat pipe 6 length may be selected to position a support plate 4 very close to window 18.

The luminaire 16 may be a typical outdoor luminaire of the type used for parking lot and security lighting, mounted on poles or on the sides of buildings. The luminaire 16 may comprise an enclosure of metal, typically aluminum or steel, and one or more window 18 to emit light generated from a source placed inside. A lighting assembly may be placed inside the luminaire 16, with a mounting plate 8 attached securely to the luminaire 16 by a bolt 14 which may pass through a hole drilled in the top of luminaire 16 and may thread into a hole 10 in the mounting plate 8.

The lighting assemblies may advantageously provide a modular unit that can be used to retrofit one or more luminaires. A desired light output may be provided for a luminaire. Based on the desired light output, a number of lighting assemblies may be selected. The selected number of lighting assemblies may be provided within the luminaire. In some embodiments, based on the desired light output, a number of light source modules 2 may be selected. The selected number of light source modules may be provided within the luminaire. The selected number of light source modules may be distributed over one or more lighting assembly. In some embodiments, based on the desired light output, a number of light sources may be selected. The selected number of light sources may be distributed over one or more light source modules which may be distributed over one or more lighting assembly.

Figure 8:
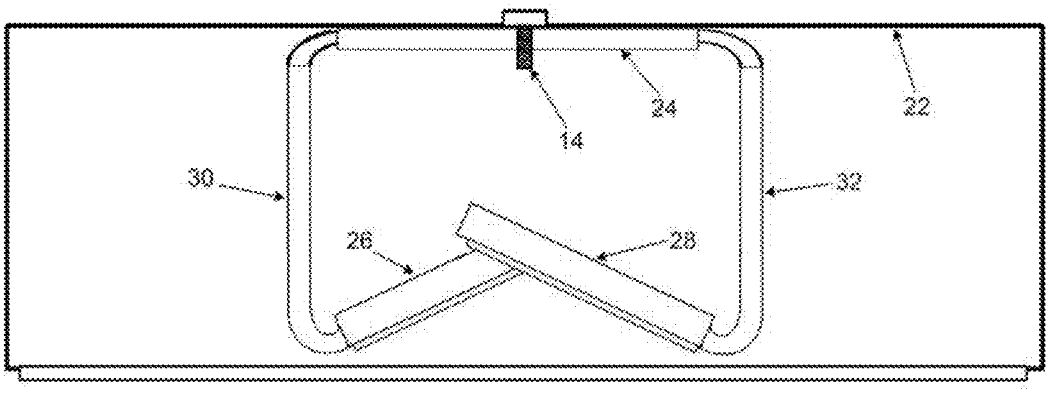
FIG. 8 shows two lighting units mounted inside a luminaire but facing in opposite directions to direct light to the sides of the luminaire.

A lighting assembly may or may not be standardized to provide a specified light output. A luminaire may be retrofitted by selecting a desired number and/or arrangement of lighting assemblies to fit the desired characteristics of the luminaire. Such characteristics may include desired light output, light distribution and/or physical size of the housing. In one example, a single lighting assembly may be mounted within a luminaire housing, as shown in FIG. 5A. In another example, two lighting assemblies may be mounted within a luminaire housing, as shown in FIG. 8. Any number of lighting assemblies, such as 1, 2, 3, 4, 5, 6, 7, 8, or more lighting assemblies may be mounted within a luminaire housing.

The modularity may also be advantageous in conforming to various luminaire housing configurations. For example, various luminaire housings that may be retrofitted may have different dimensions. For example, some luminaire housings may be larger than others, or may have different shapes. One, two or more lighting assemblies may be arranged in the luminaire housing in different configurations to conform to the size requirements of the various luminaire housings. For example, in an elongated luminaire housing, the lighting assemblies may be provided in a row, while in a more squat, centralized luminaire housing, the lighting assemblies may be provided in an array. Thus, the same type of lighting assemblies may be used to conform to different luminaire housing configurations and different desired light outputs. Thus, retrofitting existing luminaire housings does not require creating a specialized lighting assembly, standardized lighting assemblies can be selected and used.

The modularity of the lighting assembly may also enable the lighting assembly to be mounted at any portion of a luminaire housing. For example, the lighting assembly may be centered within a luminaire housing. Alternatively, it may be toward a side or corner of a lighting assembly.

The lighting assembly may be mounted so that the light source module 2 may be close to a window 18. The location of the lighting assembly's mounting may be selected so that a light source module is at a desired distance from the window. In some embodiments, the light source module may be within 5 cm, 4 cm, 3 cm, 2 cm, 1 cm, 7 mm, 5 mm, 3 mm, or 1 mm of a window. In some embodiments, at least a portion of the light source module may be within 5 cm, 4 cm, 3 cm, 2 cm, 1 cm, 7 mm, 5 mm, 3 mm, or 1 mm of a window.

The mounting plate of the light assembly may be mounted on any surface of the luminaire housing. In some embodiments, the luminaire housing may have a back surface (surface furthest away from a window) and one or more side surface (e.g., surface between the back surface and window). The mounting plate may be affixed to the back internal surface of the luminaire housing. Alternatively, the mounting plate may be affixed to a side internal surface of the luminaire housing. In some embodiments, the heat pipes may be sized or shaped so that the support plate and light source module are at a desired position relative to a window. In some embodiments, a plurality of light assemblies may be provided within a luminaire housing. The light assemblies may all be mounted on the same surface of the luminaire housing or may be mounted on different surfaces of the luminaire housing to achieve a desired light distribution.

Figure 5B:
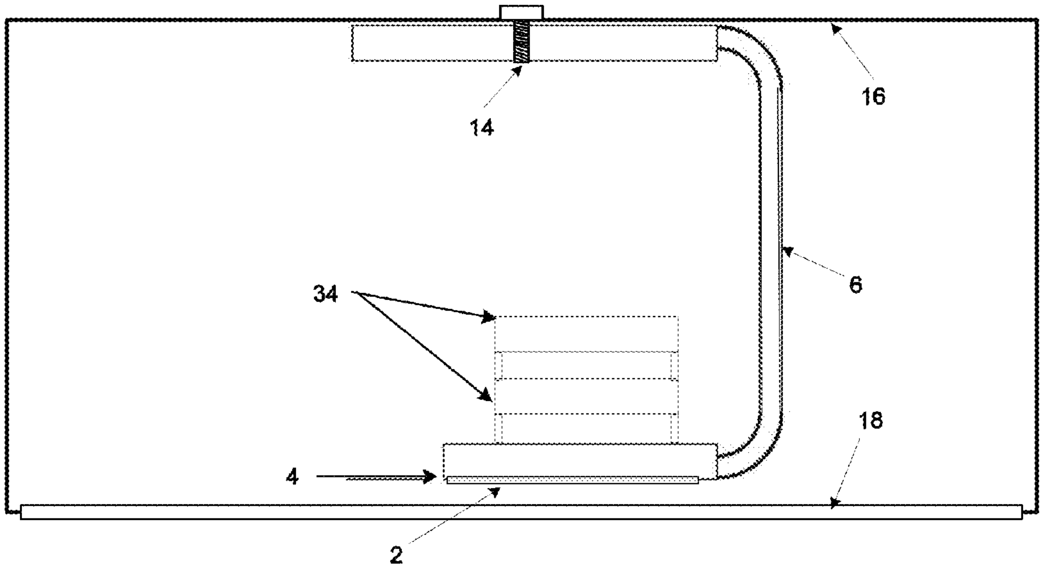
FIG. 5B illustrates a lighting unit within a luminaire having a driver located thereon

FIG. 5B illustrates a lighting unit within a luminaire having a driver located thereon. In this illustration driver boards 34 are shown in place but wire connections are omitted for simplicity. The driver boards may optionally be mounted on a portion of the lighting assembly. For example, the driver boards may be mounted on a heat-dissipating portion of the lighting assembly, such as a support plate 4 or mounting plate 8. The driver boards could be mounted within the luminaire housing without having to be mounted on the lighting assembly. For example, the driver boards could be mounted on or within a luminaire housing. Alternatively, the driver boards can be mounted external to the luminaire housing.

One or more driver boards 34 may be provided per light source module 2. In some embodiments, one or more driver boards may be provided per lighting assembly, which may have one or more light source modules. One or more driver boards may be provided per luminaire, which may have one or more lighting assembly.

The driver board may receive electrical energy from a power source. The power source may be external to the luminaire or may be within the luminaire. In some examples, the power source may be a grid or utility. The power source may be an electrical generator. In some embodiments, the power source may be an energy storage system, such as a battery or ultracapacitor. The driver board may receive the electrical energy from the power source via a conductive relay, such as a wire. The conductive relay may be part of a pre-existing luminaire, added lighting assembly, or may be added during a retrofit process.

Figure 6:
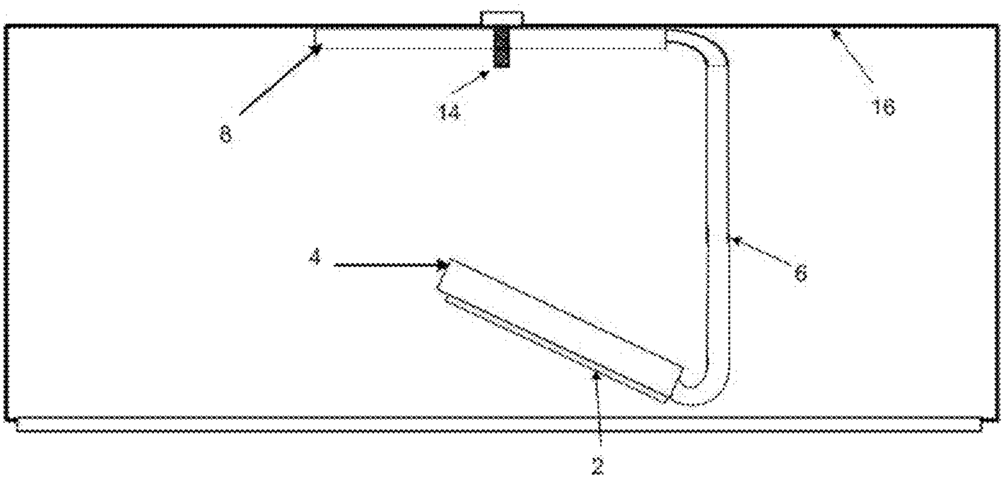
FIG. 6 illustrates a lighting segment where a support plate is at an angle with respect to a base plate, aiming the LED module at a corresponding angle, in accordance with another embodiment of the invention.

FIG. 6 illustrates a lighting segment where a support plate is at an angle with respect to a base plate, aiming the LED module at a corresponding angle, in accordance with another embodiment of the invention.

One or more lighting assembly may be mounted in a luminaire 16 with the bend angle of heat pipes 6 adjusted so that support plate 4 and LED modules 2 are at an angle with respect to a window 18.

This may change the angle at which the light is directed out of the luminaire, which may change the pattern of light emitted by the luminaire. In practice, this angle can be adjusted to any angle; typically, 45 degrees may be the most useful. In some embodiments, this angle can be greater than, less than, or equal to about 0 degrees, 5 degrees, 10 degrees, 15 degrees, 20 degrees, 30 degrees, 40 degrees, 45 degrees, 50 degrees, 60 degrees, 70 degrees, 80 degrees, 90 degrees, 110 degrees, 120 degrees, 130 degrees, 140 degrees, 150 degrees, 160 degrees, 170 degrees, or 180 degrees.

In one embodiment, the heat pipes 6 may be bent so that a support plate 4 is provided over a mounting plate 8 and is or is not parallel relative to the mounting plate. In other embodiments, the heat pipes may be bent the other way so that the support plate is not over the mounting plate and is or is not parallel to the mounting plate. The support plate may be bent so that the face of the support plate with the LED modules 2 may be facing toward a window 18, away from a window, orthogonal to a window, or at some oblique angle to the window.

Further, the lighting assembly can be rotated around mounting bolt 14 a full 360 degrees to change the location of the directed light in any manner desired. The lighting assembly can be rotated about an axis passing through the mounting bolt and extended parallel to the mounting bolt. The bolt 14 may then be tightened to secure the assembly in position.

The lighting assembly may be rotated any number of degrees about the axis. In some embodiments, the lighting assembly may be rotated more than, less than, or about 15 degrees, 30 degrees, 45 degrees, 60 degrees, 75 degrees, 90 degrees, 120 degrees, 150 degrees, 180 degrees, 210 degrees, 240 degrees, 270 degrees, 300 degrees, 330 degrees, 345 degrees, or 360 degrees. The lighting assembly may be rotated so that an edge of the mounting plate is parallel to a wall of a luminaire. Alternatively, the edge of the mounting plate may be at any angle relative to the wall of the luminaire, including any angles described elsewhere herein.

The lighting assembly may be positioned within the luminaire by having multiple degrees of freedom. For example, the lighting assembly may have a degree of freedom about the axis passing through the mounting bolt. The lighting assembly may have a degree of freedom about an axis about which one or more heat pipes may bend. The lighting assembly may also have a translational degree of freedom depending on where the mounting plate is mounted to the luminaire housing.

Although driver boards are not illustrated herein, they may be provided on the support plate as described elsewhere herein. Alternatively, they may be provided on another portion of the lighting assembly or luminaire, as described elsewhere herein.

Figure 7:
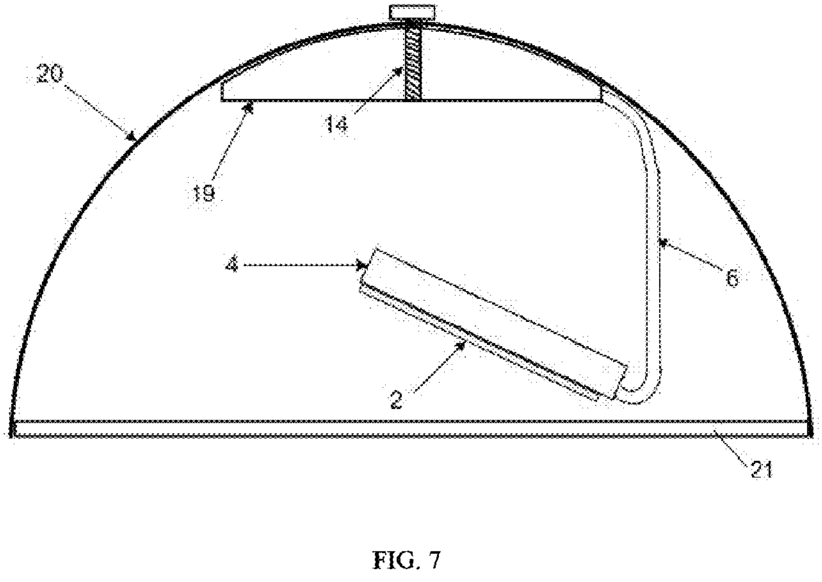
FIG. 7 shows another embodiment in which a base plate is shaped to fit the contour of a luminaire in accordance with an embodiment of the invention.

FIG. 7 shows another embodiment in which a mounting plate is shaped to fit the contour of a luminaire in accordance with an embodiment of the invention. A lighting assembly may be provided with a support plate 4 supporting one or more light source module 2, and that is connected to a mounting plate 19 through one or more heat pipe 6. The lighting assembly may be at least partially enclosed by a luminaire housing 20 which may or may not have a window 21.

For example, a mounting plate 19 may be shaped on one side to conform to the shape of a luminaire housing 20, enabling good contact between mounting base 19 and luminaire 20 when they are attached. In some embodiments, the mounting plate and luminaire may be attached using a screw 14. The mounting plate and luminaire may be attached using any other attachment technique described elsewhere herein.

A luminaire may have a rounded portion of the housing 20. A mounting base 19 may be rounded to approximately or exactly match the contour of luminaire 20. A mounting bolt 14 may pass through a hole drilled in a luminaire 20 and may thread into a tapped hole in a mounting base 19. In a preferable embodiment, the bolt 14 may be type ¼-20, which may have sufficient strength to firmly attach the mounting base 19 to the luminaire 20.

A surface of a mounting base contacting a luminaire may have a shape complementary to the internal housing of the luminaire that the mounting base is contacting. For example, the internal surface of the luminaire may be flat, curved, or have surface features thereon. The shape of the mounting base may be flat, curved or have surface features that may complement the shape of the luminaire surface.

A mounting base may have one or more surface. The mounting base may have a contact surface that faces the luminaire housing. The mounting base may have a contact surface that is closest to a luminaire housing. The contact surface of the mounting base may be a surface of the mounting base furthest from a support plate. In some instances, all or most of the contact surface of the mounting base may contact the luminaire surface. By having all or most of the mounting base contact surface in contact with the luminaire surface, a good thermal connection may be provided. A force may be exerted on the mounting base toward the luminaire housing, which may improve the thermal connection. In some embodiments, an increased or maximized contact and effective heat transfer is provided between the mounting base and luminaire housing.

The surface of the mounting base or the luminaire housing may be rigid, semi-rigid, or flexible. In some embodiments, the surface of the mounting base or the luminaire housing may be partially flexible in order to permit the mounting base to conform to the surface of the luminaire housing. The mounting base may directly contact the surface of the luminaire. Alternatively, a thermal interface layer may be provided between the mounting base and luminaire housing, which may permit heat conduction and an increased surface area of contact. The thermal interface layer may be a material of high thermal conductivity. The thermal interface layer may be a flexible material that may conform to the surface shape of the mounting base and/or the luminaire housing. In another example, the thermal interface layer may be a thermal grease, or other gel-like material.

In accordance with an embodiment of the invention, the mounting base may have a standardized shape which may or may not conform to the luminaire housing surface shape. An interface layer may be selected that may fit between the mounting base and the luminaire housing. The interface layer may have a flexible or conformable shape that may permit a strong thermal connection between the mounting base and the luminaire housing via the interface layer. In some embodiments, the interface layer may have different shapes which may be selected to fit between the mounting base and the luminaire housing. Thus, a standardized lighting assembly may be employed with only the interface layer having to be swapped out for non-standard luminaire configurations. A screw or other fastener passing through the mounting base may also pass through the interface layer. As previously mentioned, the interface layer may have a high thermal conductivity.

Although driver boards are not illustrated herein, they may be provided on the support plate as described elsewhere herein. Alternatively, they may be provided on another portion of the lighting assembly or luminaire, as described elsewhere herein.

FIG. 8 shows two lighting units mounted inside a luminaire in accordance with another embodiment of the invention. The two lighting units may be mounted side-by-side but are facing opposite directions to direct light to the sides of the luminaire. The two lighting units may or may not share a mounting plate.

Two or more lighting units may be mounted to a luminaire 22. A shared mounting plate 24 may be attached to the inside surface of the luminaire using a mounting bolt 14 or any other mounting technique described elsewhere herein. Separate support plates 26, 28 may be connected to the shared mounting plate 24 by one or more heat pipes 30, 32. This may enable the support plates 26, 28 to be positioned at different angles relative to one another by changing heat pipes 30, 32 bend angles. In some embodiments, the heat pipes may be mounted on the same side of the shared mounting plate 24. In other embodiments, the heat pipes may be mounted on opposing sides of the shared mounting plate, or any other combination of sides of the shared mounting plate.

Any number of lighting units may share a mounting plate. For example, one, two, three, four, five, six, seven, eight, or more lighting units may share a mounting plate. Sharing a mounting plate may enable the lighting units to be attached to a luminaire quickly and easily. For example, a single bolt may be employed to attach the mounting plate to the luminaire. Each of the separate support plates for the lighting units sharing a mounting plate may be connected to the shared mounting plate by one, two, or more heat pipes.

Alternatively, the lighting units need not share a mounting plate. One, two, three, four, five, six, seven, eight, or more lighting units may be provided, each with their own mounting plate. Having separate mounting plates may provide more flexibility in the positions of the lighting units relative to one another. Each of the separate support plates for the lighting units with the separate mounting plates may be connected by one, two, or more heat pipes.

The heat pipes (in the shared mounting plate or separate mounting plate scenarios) may be bent so that the separate support plates are as desired angles relative to a window or optically transmissive portion of the luminaire. The support plates may be parallel or non-parallel relative to one another. A first support plate may be angled in a first direction, and a second support plate may be angled in a different second direction. The support plates may be angled toward one another, away from one another, or have any other position or orientation relative to one another.

The combination of support plate positions with light source modules disposed thereon may provide a desired light distribution. The desired light distribution may provide a widely distributed divergent light, or a more convergent, focused light. The desired light distribution may be primarily directed in a single direction or multiple directions. A greater concentration of light may be directed in a single direction or multiple directions.

Although driver boards are not illustrated herein, they may be provided on the support plate as described elsewhere herein. Alternatively, they may be provided on another portion of the lighting assembly or luminaire, as described elsewhere herein.

The pattern and intensity of light emitted from a luminaire is known in the industry as photometrics. Legacy lighting technology and prior art relies on custom optics consisting of reflectors and lenses to direct and distribute the light. Many different types of reflectors, lens types and sizes are used to achieve the full range of photometrics required by lighting applications. Embodiments of the invention are capable of achieving most of the various photometrics and lighting types in many cases without the need for reflectors and lenses. One or more lighting units may be placed into a luminaire to get the level of illumination required (total amount of light emitted) and adjusted (LED module mounting angle and assembly rotated) to accomplish the distribution of light required.

For example, one lighting unit of the preferred embodiment with the light shining straight downward in the direction of gravity may replace a 175 watt metal halide light source and accomplishes a lighting type 2 (round spot of light) on the ground. Two lighting units, placed into a luminaire with the LED modules angled with the respect to the luminaire window and facing in opposite directions, may replace a 250 Watt Metal halide bulb and provides a modified type 2 (elongated shape) by putting more light to the sides.

The preferable embodiments, and variations accomplished by slight modifications, may solve the challenges discussed earlier in this document. Embodiments of the invention may provide a platform to easily mount LED modules inside an existing luminaire, may sink heat generated by the LEDs to the luminaire, and can eliminate the need for reflectors or lenses in many applications. High-brightness LED lighting can be retrofitted into almost any luminaire with enough area and heat-sinking capacity including replacing high-powered (400 W) lighting sources in outdoor luminaires.

Another embodiment is a single LED module version using the same materials and with half the total mounting plate area, which is essentially the embodiment described in this document cut in half. A single LED module may be mounted on a plate, with two heat pipes transferring the heat to another plate. This version is useful in smaller luminaires that do not need the higher light output level of the two LED module design, or in luminaires where mounting areas are small or limited.

Methods

Methods for illumination may be provided in accordance with an aspect the invention. A method of illumination may comprising providing electrical energy one or more light source supported by a thermally conductive support plate. The method may also include at least partially enclosing the one or more light source within a housing, conducting heat from the light source through the support plate to one or more heat pipe, conducting heat through the heat pipe to a thermally conductive base plate; and conducting heat from the base plate to the housing, thereby allowing heat to dissipate into the ambient air.

The methods for illumination may include employing any of the lighting assembly embodiments or luminaire configurations described elsewhere herein.

Methods for retrofitting a luminaire may be provided. Such methods may include providing a pre-existing luminaire housing. In some embodiments, a pre-existing luminaire may have one or more internal components removed to provide the luminaire housing. In some embodiments, previously existing electrical connections may be intact or may be removed. Previously existing luminaire windows or optics may be intact or may be replaced or removed.

The method for retrofitting may also include inserting a lighting unit into the luminaire housing. The lighting unit may have one or more light source supported by a thermally conductive support plate; and one or more heat pipe connected to the thermally conductive support plate and to a thermally conductive base plate. The lighting unit may have any of the configurations described elsewhere herein according to embodiments of the invention or combined embodiments of the invention. Depending on the number of lighting units, the method may also include inserting one or more lighting units into the luminaire housing.

The method may include mounting the lighting unit to the luminaire. For instance, the method may include affixing the thermally conductive base plate to an interior surface of the luminaire housing. In some embodiments, the method may also include selecting a number of lighting units and the positions of the lighting units relative to one another. For example, the method may include selecting the surface of the luminaire to mount a lighting unit and/or the position on the selected luminaire surface to mount the lighting unit. The number and positions of lighting units may be selected based on a desired light output and distribution pattern. The method may also include selecting a bend in the heat pipes to provide a desired angle of a support plate relative to a window. Optionally, the method may include adjusting the bend in the heat pipes to create the desired angle of the support plate relative to the window. The bend in the heat pipe may be selected based on a desired light output and distribution pattern.

Example

The data in the following table were taken by a U.S. Dept. of Energy-approved independent testing laboratory to confirm the heat-transfer capability of the structure.

In a first example, a "wallpack" unit is a luminaire housing that originally contained a 150 Watt bulb. All of the internal components were removed and a single lighting assembly of the type shown in FIG. 1 was installed.

In a second example, a rectangular "shoebox"-type pole-mounted parking lot light that originally contained a 250 W bulb was retrofitted with two of the assemblies shown in FIG. 1.

The heat sink temperature listed is the temperature of the support plate 4 as shown in FIG. 1 when the unit has warmed up completely. In practice, heat sink temperature may be preferably kept below 80 degrees C. in order to prevent the LEDs from getting too hot which will shorten their life dramatically. As shown in the table below, even with the compact size, the heat is transferred effectively. Heat sink temps are below 70 degrees C. The large area of the luminaire cases are heated to a temperature less than 10 degrees below the mounting plate (plate 8 in FIG. 1) showing they effectively sink the heat.

| Unit Tested | Ambient Air Temp, C. | Heat Sink Temp, C. | Luminaire Case Temp, C. |
|---|---|---|---|
| Wallpack | 24.3 | 61.4 | 53.1 |
| Shoebox | 25.1 | 67.2 | 58.1 |

By demonstrating an effective heat transfer, the LEDs are kept within a desirable temperature range. This permits the LEDs to function efficiently and to prevent their life from being prematurely shortened. The LED lighting assemblies may provide a cost-effective and energy efficient way to retrofit luminaires.

Furthermore, typically about 65% less energy is consumed with embodiments of the present invention compared to conventional luminaires, to provide equivalent, or in some cases, better lighting than what is replaced. The numbers may vary according to the specific application and what the customer wants, but a range of 60% to 70% less energy consumption may occur in many cases. The LED lighting assemblies and retrofitting techniques described herein may provide environmentally friendly reduced energy consumption.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of retrofitting a luminaire comprising:

providing a pre-existing luminaire housing;

inserting a lighting unit into the luminaire housing, said lighting unit capable of conforming to various luminare housings and having:

one or more light source supported by a thermally conductive support plate; and one or more heat pipe connected to the thermally conductive support plate and to a thermally conductive base plate; and affixing the thermally conductive base plate to an interior surface of the luminaire housing, wherein the luminaire housing is not pre-configured for receiving the lighting unit, wherein the base plate is affixed so that the support plate is at a non-parallel angle relative to a housing surface closest to the support plate by selecting a degree of bend in a heat pipe of the one or more heat pipe and wherein heat is conducted from the thermally conductive base plate to an exterior surface of the luminaire housing.

2. The method of claim 1 wherein the support plate is closest to a surface through which light can be transmitted.

3. The method of claim 1 further comprising selecting a number of lighting units to insert into the housing based on a desired amount of illumination and the size of the housing.

4. The method of claim 1 further comprising inserting an additional lighting unit into the luminaire housing.

5. The method of claim 1 further comprising selecting a position of the lighting unit relative to the luminaire housing based on a desired light output and distribution pattern.

6. The method of claim 4 further comprising selecting positions of the lighting unit and the additional lighting unit relative to the luminaire housing based on a desired light output and distribution pattern.

7. The method of claim 1 further comprising selecting the bend based on a desired light output and distribution pattern.

8. The method of claim 1 further comprising selecting the bend to provide a desired angle of the support plate relative to a window.

9. The method of claim 1 further comprising adjusting the bend to create a desired angle of the support plate relative to a window.

10. The method of claim 1 further comprising shaping the thermally conductive base plate to conform to the interior surface of the luminaire housing.

11. The method of claim 10 further comprising shaping the thermally conductive base plate as a flat plate for mounting to a flat surface of the interior surface of the luminaire housing.

12. The method of claim 10 further comprising shaping the thermally conductive base plate to provide a complementary surface for conforming to a curved surface of the interior surface of the luminaire housing, an irregular surface of the interior surface of the luminaire housing, or a surface of the interior surface of the luminaire housing having features thereon.

13. The method of claim 12 further comprising shaping the thermally conductive base plate by casting or machining.

14. The method of claim 1 further comprising providing a spacer made of the same material as the base plate and shaped to conform to the contour of a mounting surface of the interior surface of the luminaire housing.

15. The method of claim 1 further comprising contacting a surface area of the thermally conductive base plate with the interior surface of the luminaire housing.

16. The method of claim 1 further comprising affixing the thermally conductive base plate to the interior surface of the luminaire housing a bolt, a screw, a fastener, an adhesive, or locking into position.

17. The method of claim 16 further comprising providing a mounting hole that passes through the luminaire housing.

18. The method of claim 1 further comprising providing a driver for controlling the lighting unit, said driver directly or indirectly mounted on the support plate.

* * * * *

UNITED STATES PATENT AND TRADEMARK OFFICE

CERTIFICATE OF CORRECTION

PATENT NO. : 8,506,135 B1
APPLICATION NO. : 13/031154
DATED : August 13, 2013
INVENTOR(S) : Oster It is certified that error appears in the above-identified patent and that said Letters Patent is hereby corrected as shown below:

In the claims

Column 20, line 22, Claim 1, delete “luminare” and insert --luminaire--, therefor Column 20, line 36, Claim 1, after “pipe”, insert --,--, therefor Column 21, line 10, Claim 14, delete “1” and insert --10--, therefor Column 21, line 19, Claim 16, after “housing”, insert --using--, therefor Signed and Sealed this
Twelfth Day of January, 2016

*Michelle K. Lee*

Michelle K. Lee
*Director of the United States Patent and Trademark Office*